United States Patent
Honhoff et al.

(10) Patent No.: US 9,562,515 B2
(45) Date of Patent: Feb. 7, 2017

(54) METHOD AND APPARATUS FOR WIND TURBINE NOISE REDUCTION

(71) Applicant: General Electric Company, Schenectady, NY (US)

(72) Inventors: Saskia Honhoff, Salzbergen (DE); Andreas Herrig, Garching b. Munich (DE); Farzad Taghaddosi, Niskayuna, NY (US); Sarah Delport, Garching b. Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1004 days.

(21) Appl. No.: 13/756,877

(22) Filed: Feb. 1, 2013

(65) Prior Publication Data
US 2014/0219795 A1   Aug. 7, 2014

(51) Int. Cl.
F03D 7/02   (2006.01)

(52) U.S. Cl.
CPC ........... F03D 7/0296 (2013.01); F03D 7/0204 (2013.01); F05B 2260/96 (2013.01); Y02E 10/723 (2013.01)

(58) Field of Classification Search
CPC .... F03D 7/0204; F03D 7/0208; F03D 7/0212; F03D 7/0296; F03D 11/0091; F05B 2260/96
See application file for complete search history.

(56) References Cited

U.S. PATENT DOCUMENTS

| | | | | |
|---|---|---|---|---|
| 7,118,339 B2 * | 10/2006 | Moroz | | F03D 1/008 415/4.3 |
| 2010/0117368 A1 * | 5/2010 | Benito | | F03D 7/0204 290/55 |
| 2011/0116443 A1 | 5/2011 | Yu et al. | | |
| 2011/0173703 A1 | 7/2011 | Kim et al. | | |
| 2011/0173771 A1 | 7/2011 | Park | | |
| 2011/0176144 A1 | 7/2011 | Chen | | |

OTHER PUBLICATIONS

Bowdler, "Wind Shear and Its Effect on Noise Assessment of Wind Turbines", pp. 1-14, Jun. 2009.

* cited by examiner

*Primary Examiner* — Craig Kim
*Assistant Examiner* — Juan G Flores
(74) *Attorney, Agent, or Firm* — GE Global Patent Operation; Douglas D. Zhang

(57) ABSTRACT

A method for operating a horizontal axis wind turbine is provided, the wind turbine including: a rotor including a rotor blade, wherein the rotor is rotatably coupled to a nacelle, and the rotor is rotatable about a horizontal rotor axis extending through the nacelle, and the nacelle is rotatably coupled to a tower, the nacelle rotatable in a yaw plane about a yaw axis. The method includes determining a wind direction; determining a yaw angle setting, wherein the yaw angle setting deviates from an alignment of the rotor axis and the wind direction in the yaw plane; yawing the nacelle to the yaw angle setting; and operating the wind turbine for example to generate electricity.

8 Claims, 11 Drawing Sheets

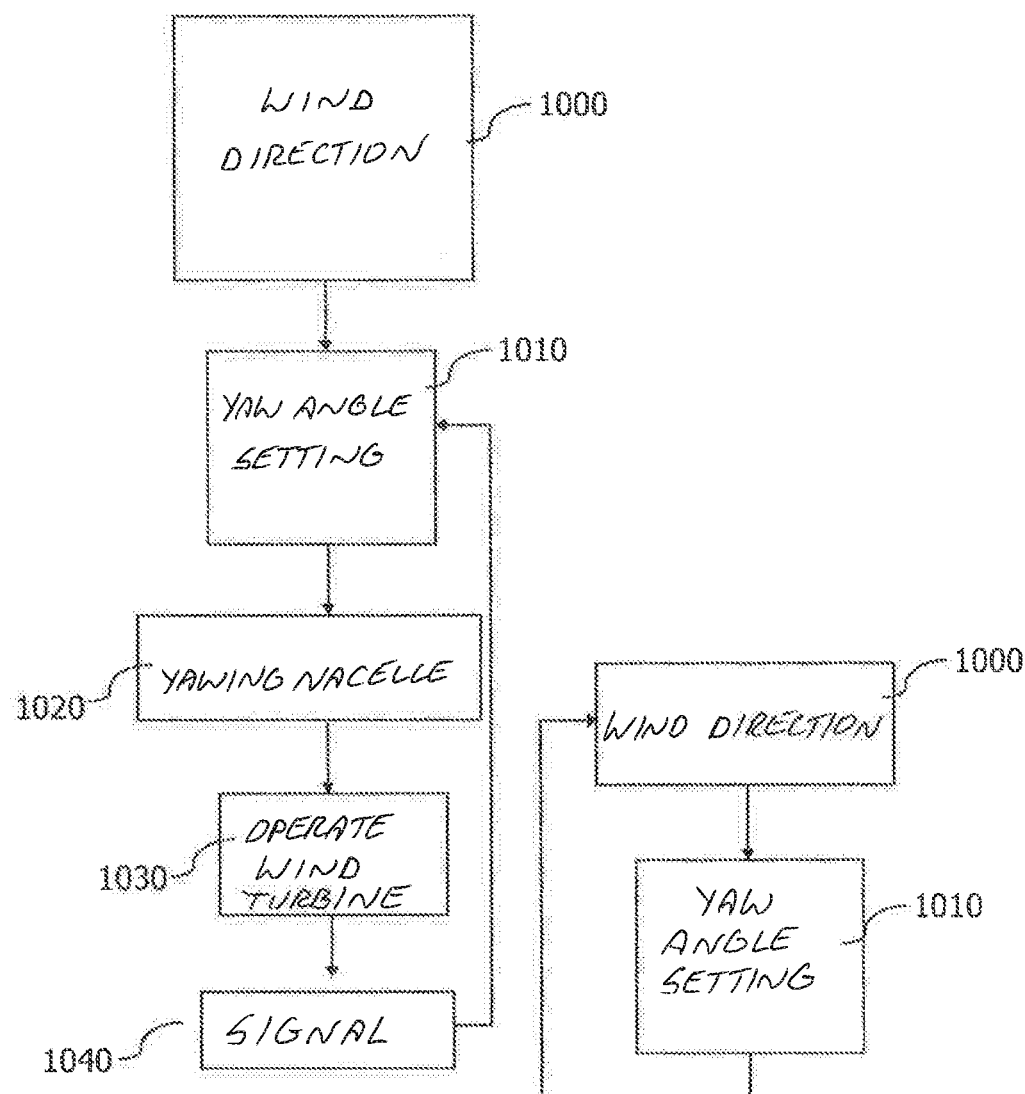

METHOD AND APPARATUS FOR WIND TURBINE NOISE REDUCTION

BACKGROUND OF THE INVENTION

The subject matter described herein relates generally to a wind turbine generator, methods and systems for controlling a wind turbine generator, and more particularly, to methods and systems for reducing noise generated by a wind turbine generator such as noise amplitude modulation and/or abnormal noise amplitude modulation.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity. Acoustic noise is also generated. It is desirable to reduce noise generated from wind turbines. Embodiments described herein address wind generator noise, particularly amplitude modulation noise and abnormal amplitude modulation noise.

BRIEF DESCRIPTION OF THE INVENTION

In one aspect, a method for operating a horizontal axis wind turbine is provided, the wind turbine including: a rotor including a rotor blade, wherein the rotor is rotatably coupled to a nacelle, and the rotor is rotatable about a horizontal rotor axis extending through the nacelle, and the nacelle is rotatably coupled to a tower, the nacelle rotatable in a yaw plane about a yaw axis. The method includes determining a wind direction; determining a yaw angle setting (210), wherein the yaw angle setting (210) deviates from an alignment of the rotor axis and the wind direction in the yaw plane; yawing the nacelle to the yaw angle setting (210); and operating the wind turbine.

In another aspect, a system for controlling noise generated by a horizontal axis wind turbine is provided, the wind turbine including a rotor including a rotor blade, wherein the rotor is rotatably coupled to a nacelle, and the rotor is rotatable about a horizontal rotor axis extending through the nacelle. The nacelle is rotatable in a yaw plane about a yaw axis. The system comprising a processor, a signal input, and a signal output. The system is adapted for: determining a wind direction and determining a yaw angle setting (210). The yaw angle setting (210) deviates from an alignment of the rotor axis and the wind direction in the yaw plane.

In yet another aspect, a horizontal axis wind turbine is provided, the wind turbine including a rotor including a rotor blade, the rotor being rotatably coupled to a nacelle and rotatable about a horizontal rotor axis extending through the nacelle; a yaw drive mechanism for rotating the nacelle in a yaw plane about a yaw axis; and a control system communicatively coupled to the yaw drive mechanism. The control system is adapted for determining a wind direction and determining a yaw angle setting (210). The yaw angle setting (210) deviates from an alignment of the rotor axis and the wind direction in the yaw plane.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 24 depicts schematically a method for operating a wind turbine, according to an embodiment.

FIG. 25 depicts schematically a method for operating a wind turbine, according to an embodiment.

DETAILED DESCRIPTION OF THE INVENTION

Figure 1:
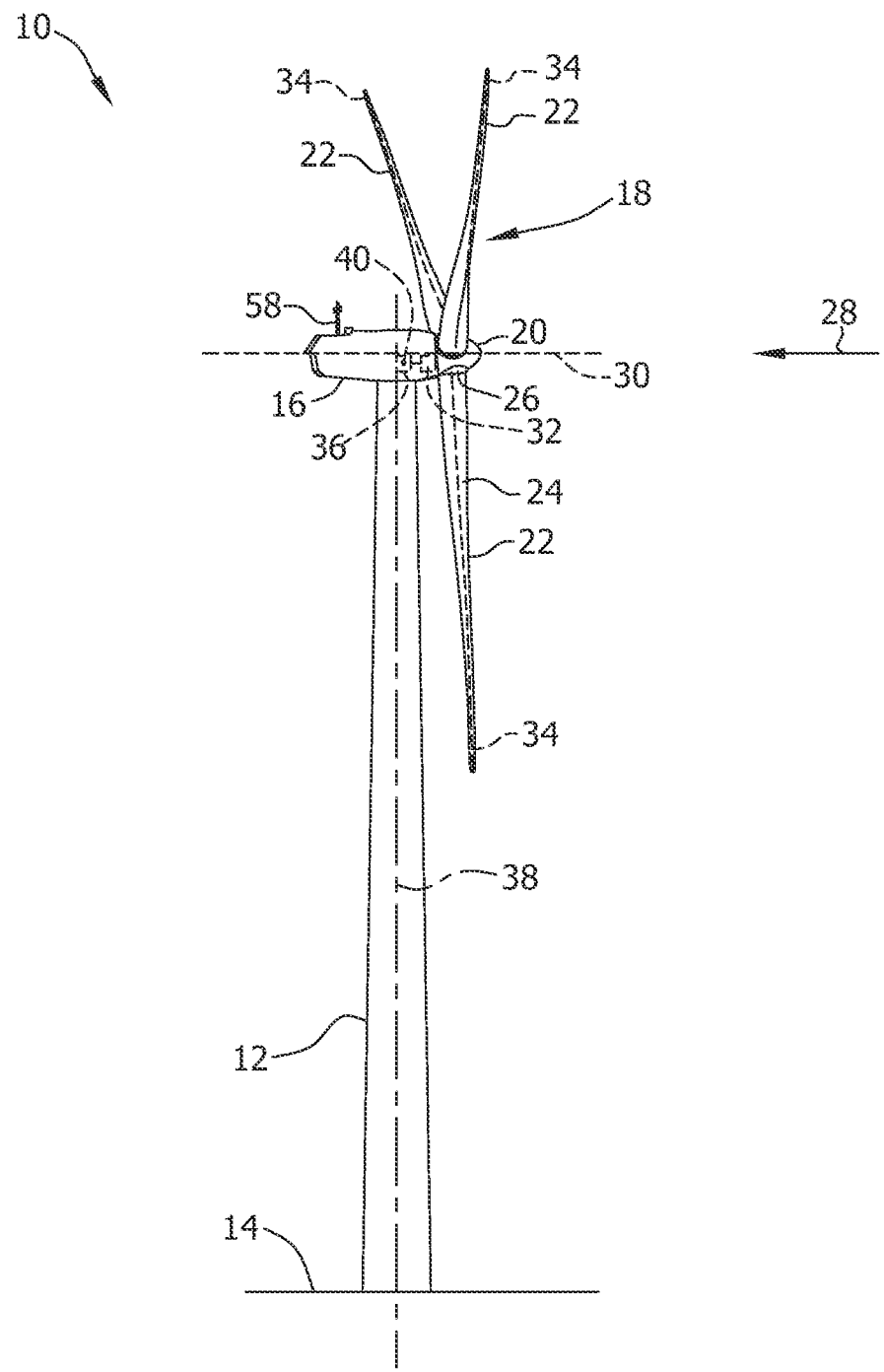
FIG. 1 is a perspective view of an exemplary wind turbine, according to an embodiment.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system and method of operating a wind turbine generator that reduce noise. More specifically, abnormal amplitude modulation, often described as a thumping noise, or having an impulsive characteristic, is reduced. In addition, it is possible that fatigue load is reduced.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Herein, the term "wind direction" can refer to a wind direction at a particular location, such as is measured by an meteorological mast; or an average wind direction, and/or a component of a wind direction. For example, "wind direction" can refer to the wind direction component oriented tangentially to the ground, perpendicularly to the tower, and/or perpendicular to a yaw axis. Alternatively or additionally, the "wind direction" or "wind" can refer to a wind directional component in a yaw plane of a nacelle, the yaw plane being perpendicular to the yaw axis.

Herein, "yaw angle" and "yaw deviation" are intended to indicate an orientation of the rotor axis and/or nacelle of the wind turbine with respect to the wind direction, i.e. the wind direction component in the yaw plane. For example, a yaw angle of 0° is intended to be representative of an alignment of the rotor axis and the wind direction in the yaw plane, i.e. the wind direction projected onto the yaw plane. In other words, the zero yaw angle corresponds to alignment of the rotor axis and the wind direction in the yaw plane. For example, if a wind turbine is operated in a condition such that the wind direction has a vertical component (i.e. a component that is perpendicular to the yaw plane), then a 0° yaw angle is intended to be representative of an alignment of the rotor axis and the nonvertical component of the wind direction that is in the yaw plane.

Herein, a horizontal rotor axis is intended to be representative of a rotor axis that is substantially horizontal (to within 10, 5, 2 or even 1 degree of horizontal), for example such that rotation of the rotors defines a substantially vertically oriented plane. Herein horizontal rotor axis, rotor axis, and axis of rotation are used interchangeably.

Herein, an azimuthal angle of 0° of a blade is intended to be representative of a blade extending upwardly from the hub of the rotor. Herein, the rotor rotates such that the azimuthal angle increases, as for example rotation of the blade caused by wind. It is recognized that alternative coordinates can be defined without departing from the scope of the embodiments disclosed herein. Herein, azimuthal angles near 0° can include the range 270° through 90°, 300° through 60°, and/or 330° through 30°.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
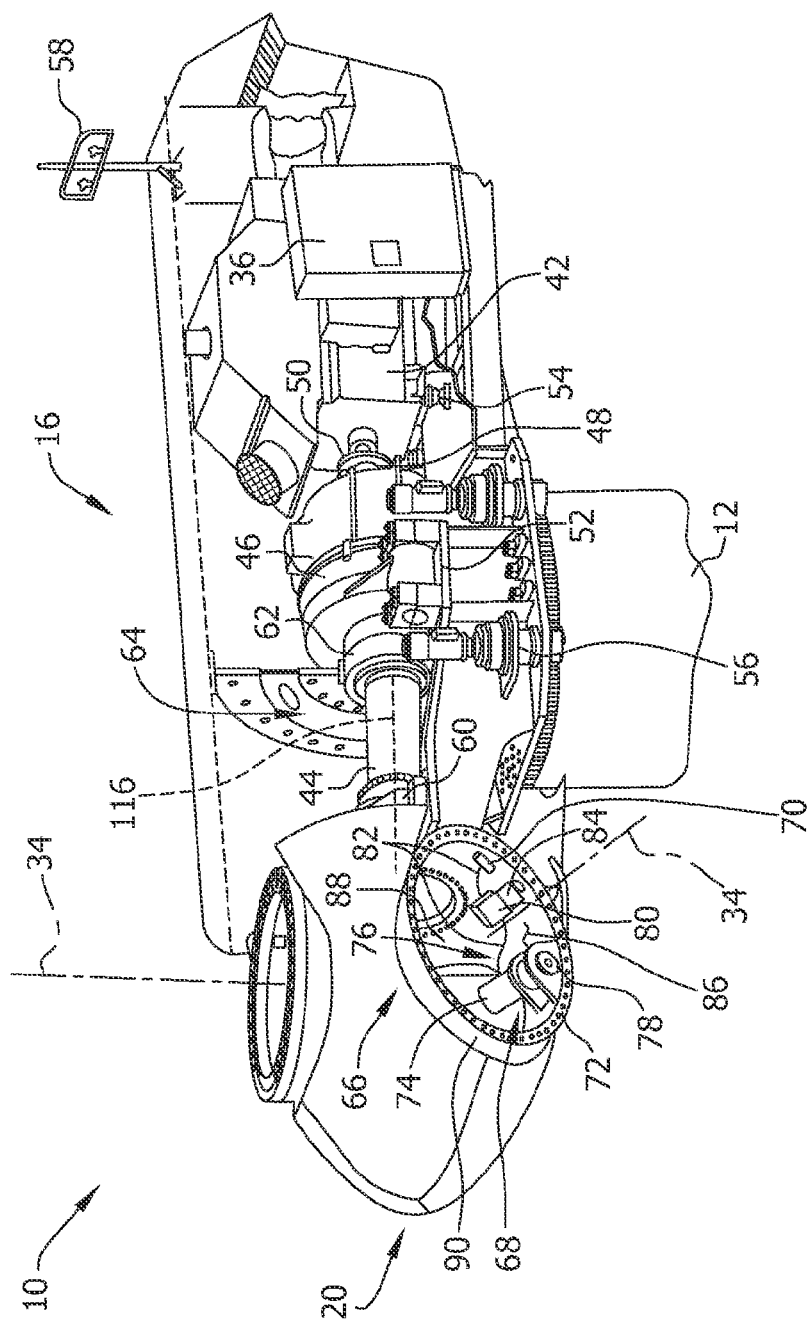
FIG. 2 is an enlarged sectional view of a portion of the wind turbine shown in FIG. 1, according to an embodiment.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

In the exemplary embodiment, controller is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

Figure 3:
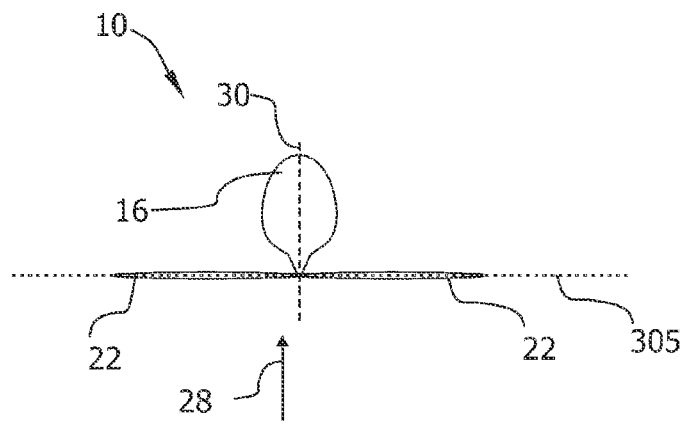
FIG. 3 is a top-view schematic representation of a wind turbine oriented normally to a wind direction, and is useful for understanding the embodiments described herein.
Figure 4:
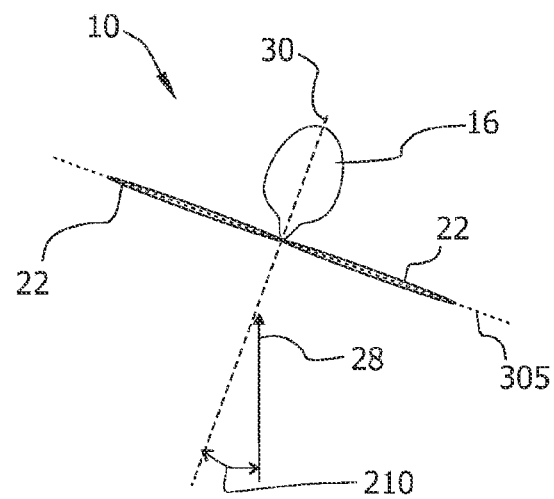
FIG. 4 illustrates a positive yaw angle, according to an embodiment.
Figure 5:
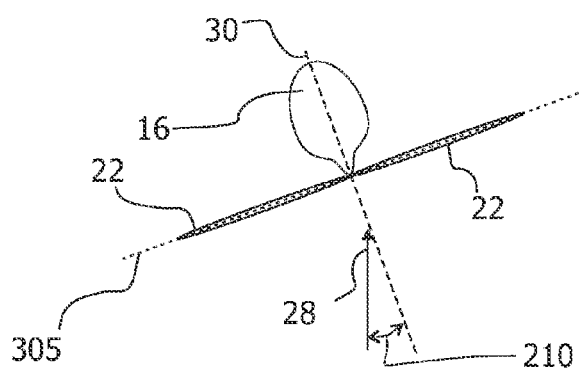
FIG. 5 illustrates a negative yaw angle, according to an embodiment.

FIG. 3 illustrates, in a nonlimiting example, a top view of a wind turbine 10 oriented at a 0° yaw angle. The rotor axis 30 and the wind direction 28 are in alignment. In other words, the rotor plane 305 is perpendicular to the wind direction 28 (the rotor plane 205 is also perpendicular to the plane of the drawing in each of FIGS. 3, 4, and 5). The yaw plane (not indicated) is coplanar with the drawings in FIGS. 3, 4, and 5, and the yaw axis 38 (not indicated) is perpendicular to the drawings. FIGS. 3, 4, and 5 also depict the nacelle 16 and rotor blades 22 of the wind turbine.

FIG. 3 illustrates a top view schematic representation of a wind turbine oriented normally to a wind direction 28, i.e. at a yaw angle of 0°. FIG. 4 illustrates a positive yaw angle 210 (e.g. 20°), and FIG. 5 illustrates a negative yaw angle 210 (e.g. −20°). In FIGS. 4 and 5, the yaw angle 210 is such that the rotor axis and wind direction in the yaw plane (plane of the drawings) are not aligned.

Herein, embodiments of wind turbines, control systems, and operational methods are described in which the yaw angle of the wind turbine can be such that the rotor plane 305 deviates from perpendicular to the direction of the wind 310 (for example see FIGS. 4 and 5), particularly such that the rotor plane 305 deviates from perpendicular to the component of the wind direction which is coplanar to the yaw plane 200. As a consequence, noise, particularly amplitude modulation and/or abnormal amplitude modulation can be mitigated.

Figure 6:
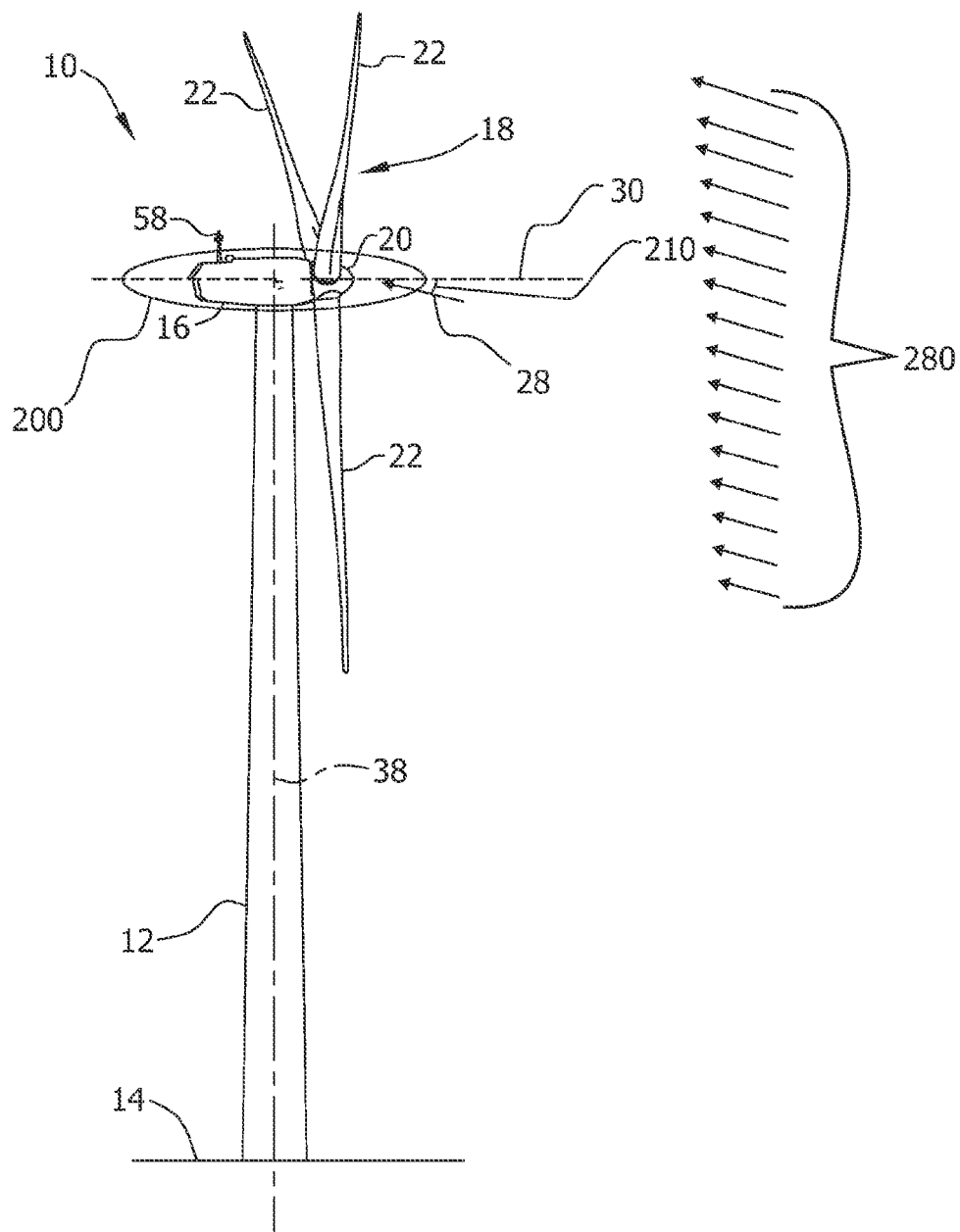
FIG. 6 illustrates a wind turbine operating at a yaw angle, particularly in a condition including wind shear, according to an embodiment.

FIG. 6 illustrates a wind turbine operating at a yaw angle 210 (yaw angle setting 210). FIG. 6 depicts the yaw axis 38, about which the nacelle 16 can be rotated in the yaw plane 200. In FIG. 6, the yaw plane 200 is drawn as an ellipse to convey perpendicularity of the yaw plane 200 and the yaw axis 38. FIG. 6 depicts wind shear 280, drawn as group of arrows, the length of which intended to represent wind speed variance with height. The group of arrows representing wind shear 280 is also directed the same direction as the arrow representing the direction 28 of the wind. Thus, in the non-limiting example illustrated in FIG. 6, the wind turbine 10 is operated at a yaw angle 210 (between the rotor axis 30 and the wind direction 28) which deviates from an alignment of the rotor axis 30 and the wind direction 28 in the yaw plane 200.

In a nonlimiting example, FIG. 6 illustrates a case that that the wind direction 28 is in the same plane as the yaw plane; in other words the wind is directed horizontally, in the same plane as the yaw plane, but at an angle with respect to the rotor axis 30. In this nonlimiting example, there is no vertical component of the wind direction 28. Because FIG. 6 provides a 3-dimensional perspective view, it may appear that there is a vertical component to the wind direction 28, however the wind direction 28 in this example is coplanar with the yaw plane 200, and has no vertical component. Furthermore, the arrows representing wind shear 280 also are intended to represent in a nonlimiting way wind directions that are in the same direction as the wind direction 28, and also have no vertical component. The flow of air represented by the wind shear 280 is directed in the same direction 28. Optionally, in this example, there is wind shear (nonzero wind shear) present, in other words the wind speed increases with height, However, it is also possible that there is no wind shear, thus there is a uniform wind speed at various heights, at least over the relevant dimensions of the wind turbine (e.g. from the ground to the top of the blade 22 oriented exactly upwardly). The wind turbine 10 can be operated at a yaw angle 210. Particularly in the case of wind shear 280, operation at a yaw angle 210 according to methods described herein can reduce noise, particularly amplitude modulation and abnormal amplitude modulation.

In an embodiment, the wind direction is determined, and the yaw angle setting (210) is determined, for example based on the wind direction and/or wind shear 280. In conditions of wind shear 280 for example, particularly vertically oriented wind shear with increasing wind speed with height as depicted in FIG. 6, operation of the wind turbine at a yaw angle reduces noise, particularly amplitude modulation and abnormal amplitude modulation.

In an embodiment, a horizontal axis wind turbine 10 includes a rotor 18 including at least one rotor blade 22. The rotor 18 is rotatably coupled to a nacelle 16 and is rotatable about a horizontal rotor axis 30 which extends through the nacelle 16. The nacelle 16 can be rotated about a yaw axis 38 in the yaw plane 200 by a yaw drive mechanism 56. A control system 36 can be communicatively coupled to the yaw drive mechanism 56, the control system being adapted for, for example, determining a wind direction and determining a yaw angle (yaw angle setting (210)) which deviates from an alignment of the rotor axis and the wind direction in the yaw plane. Operation of the wind turbine at a yaw angle reduces noise, particularly in conditions of wind shear such as vertical wind shear.

It is noted herein that the angle between the rotor axis and the wind direction, particularly the wind direction projected onto the yaw plane, is referred to as the "yaw angle," (for example see the yaw angle 210 of FIGS. 4, 5 and 6). Furthermore, herein "azimuthal angle" is in reference to the orientation of the blade as it rotates about the rotor axis 30.

Figure 7:
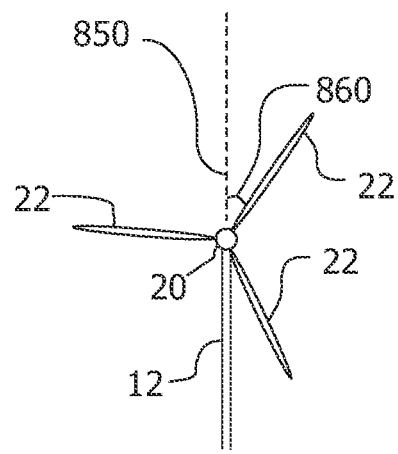
FIG. 7 illustrates the azimuthal angle of a blade, and is useful for understanding the embodiments described herein.

FIG. 7 illustrates the azimuthal angle 860 of a blade 22, in a nonlimiting example. In FIG. 7, the tower 12 is depicted, and the hub 20 is depicted. Three blades 22 are depicted. Herein, the azimuthal angle 860 of a blade is defined with respect to the vertical axis 850 (which for all practical purposes coincides with the yaw axis 38 depicted in FIG. 6). The rotor axis 30 is not shown in FIG. 6, but would be oriented out of the plane of the drawing. In other words, during operation of the wind turbine, the blades (and rotor) rotate in the plane of the drawing due to the force of wind on the blades 22, which for the sake of simplicity is oriented into the page. Typically blades rotate clockwise, each rotating 360° to return to its initial orientation. Taking into consideration only one of the blades, its azimuthal angle is defined such that the azimuthal angle of its upward orientation is 0°, and the azimuthal angle increases as the blade (and rotor) rotates clockwise. For example, the azimuthal angle 860 of the blade 22 (the upper right blade 22) shown in FIG. 7 is approximately 35°. For example, if (when) this blade 22 rotates another 55°, then this blade 22 will reach an azimuthal angle of 180°, and be oriented downwardly.

Figure 8:
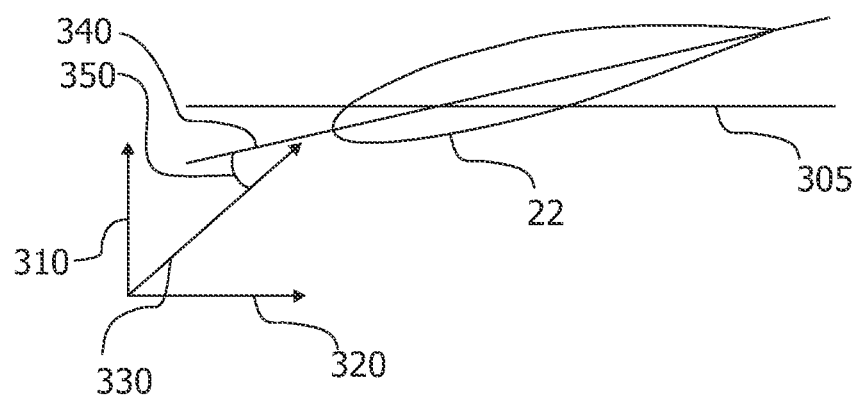
FIG. 8 illustrates schematically a rotor blade rotating in a rotor plane, and is useful for understanding the embodiments described herein.

FIG. 8 illustrates schematically a nonlimiting example of a snapshot of a cross-section of a rotor blade 22 rotating in a rotor plane 305 in the presence of wind 310 that is useful in understanding some technical features of the disclosed embodiments of the invention. In FIG. 8, the view is along the length of the blade 22 radially outwardly from the hub, albeit what is drawn is a cross-section of the blade 22 rather than the view of for example FIG. 7. In other words, it is useful to consider the perspective of a viewer in the middle of the hub looking radially outwardly, with the viewer's feet toward the source of the wind 310; in other words the viewer is oriented along the wind 310 direction depicted in FIG. 8 with the viewer's head at the tip of the arrow that represents the wind 310 and indicates its direction. As the viewer remains fixed, gazing outwardly in any direction, each blade passes by the viewer's field of view from right to left.

Note that the plane of rotation (the plane swept by the rotor blades) is the drawing plane in FIG. 7, and perpendicular to the drawing plane in FIG. 8. In the nonlimiting example shown in FIG. 8, the wind 310 is depicted to be directed perpendicular to the rotor plane 305, the rotor plane 305 being perpendicular to the drawing.

As illustrated in FIG. 8, due to the rotation of a the blade 22 in the rotor plane 305, a second component 320 of air flow is present (i.e. directed opposite to the movement of the section of the rotor blade 22), so that the apparent wind 330 is the vector sum of the wind 310 and the second component 320 of air flow. The apparent wind 330 direction relative to the chord line 340 of the blade 22 determines the angle of attack 350. It follows that for a given chord line 340 geometry (e.g. for a given pitch) and constant rotational rate (and constant magnitude of the second component 320 of air flow), that the greater the wind 310 speed, the greater the angle of attack 350. This can be understood by considering what happens to the apparent wind 330 vector depicted in FIG. 8 as the wind 310 speed increases: the wind 310 vector lengthens vertically in FIG. 8, such that when added to the second component 320 of air flow, the angle of attack 350 increases.

Wind shear 280 (see also FIG. 6) will result in a variance of wind speed 310 which depends on the azimuthal angle 860 (see also FIG. 7), due to variance of wind speed with height. Returning to FIG. 8, it can be appreciated that variance of wind speed 310, such as that due to wind shear 380, can result in variance of the angle of attack 350 as the orientation of the blade 22 changes, extending upward, then changing to downward, then upward again, as it sweeps through the azimuthal angles. In the presence of wind shear 280, the blade 22 experiences a higher wind speed at azimuthal angles near 0°, that is, when the blade is oriented upwardly. The wind speed may change continuously, and cyclically, along with the azimuthal angle 860 of the blade 22.

For example, with a vertical wind shear 280 such as that depicted in FIG. 6, wind speed 310 and angle of attack 350 are greatest at an azimuthal angle of 0°, particularly in comparison to an azimuthal angle of 180°.

FIG. 8 can illustrate a constant angle of attack 350 for the condition of the rotor plane 305 oriented perpendicular to the direction of the wind 310, i.e. a 0° yaw angle, and zero wind shear.

Abnormal amplitude modulation is believed to be caused by transient flow separation due to angle of attack variations in the rotor plane. For example, a cause of angle of attack variations can be high wind shear. In the upper part of the rotor, the wind speed is higher and thus the angles of attack are higher, increasing the risk of flow separations which can cause a thumping noise, or abnormal amplitude modulation.

In an embodiment described herein, the angle of attack 350 is reduced, for example particularly when a blade is near a vertical orientation (azimuthal angle of 0°), when in a condition of wind shear. Without being bound by theoretical considerations, by yawing the wind turbine, the leading edge of the blade 22 can cut less into the wind for some azimuthal angles of each blade 22. In conditions of wind shear 280, such as those with greater wind speeds at higher elevations, it is advantageous for the blades 22 to cut less into the wind particularly for the vertical azimuthal angles (from 270° through 0° to 90°) in which the blades are oriented at least somewhat upwardly, because those are the orientations that are subjected to the highest wind speeds.

The wind speed is typically highest when the blade is at azimuthal angles near 0°. In an embodiment, by yawing the wind turbine such that the angle of attack is reduced at azimuthal angles near zero, noise can be reduced. Furthermore, in an embodiment described herein, the percentage of time that the angle of attack of the blade, as it rotates, is above the stall angle of attack can be reduced. Furthermore, it is possible that fatigue load reduction can occur.

In an embodiment described herein, yaw angle can be used to reduce angle of attack. In an embodiment, by purposely misaligning the rotor such that in the upper part of the rotor the blade moves towards the downwind side, the angles of attack are reduced in the upper half of the rotor, compensating the effect of wind shear, particularly vertical wind shear 280. The angle of attack variation and the risk of abnormal amplitude modulation can be reduced An analytical expression for the angle of attack 350 is given below; r is the radial distance along a blade; $\psi$ is the blade azimuthal angle; H is the height of the hub 20; m is the shear exponent; a is the axial induction; $\gamma$ is the yaw angle; and $\theta$ is the pitch angle. Rotor tilt and upflow angle are ignored.

$$\tan^{-1}\left[\frac{v_\infty\left(\frac{r(\cos\psi)+H}{H}\right)^m(1-a)\cos\gamma}{v_\infty\left(\frac{r(\cos\psi)+H}{H}\right)^m(1-a)\sin\gamma\cos\psi+\omega r}\right]-\theta r$$

Figure 9:
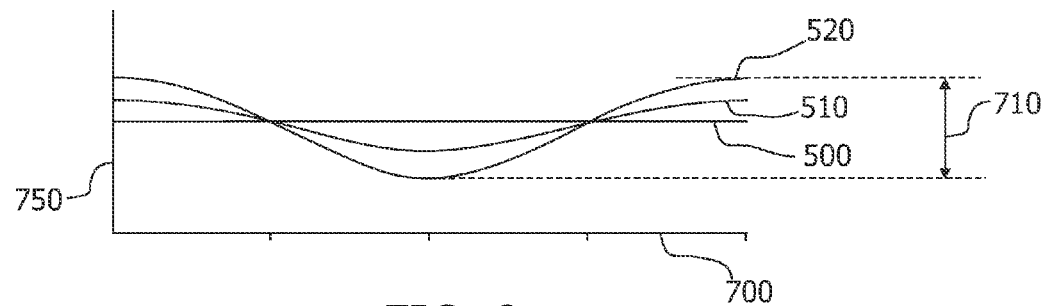
FIG. 9 illustrates the effect of both yaw angle and shear on angle of attack, according to an embodiment.

FIG. 9 illustrates the effect of wind shear on angle of attack, according to the analytical expression above. The horizontal axis 700 is the blade azimuthal angle ranging from 0° to 360°, and the vertical axis 750 is the angle of attack. In FIG. 9, the yaw angle is 0°. The angle of attack when there is no wind shear (m=0) is given by line 500. The angle of attack at wind shear (m)=0.2 is given by line 510; and the angle of attack at wind shear (m)=0.4 is given by line 520. FIG. 9 illustrates that in the absence of yaw angle misalignment, in other words at zero yaw angle, wind shear results in a variation of the angle of attack which depends on the azimuthal angle, a minimum in angle of attack occurring at an azimuthal angle of 180°, and a maximum at 0° (360°) degrees. For example, strong wind shear results in large angles of attack for blade azimuthal angles near 0°. Such high angles of attack may result in separation, stall, turbulence, noise, loss of captured energy, etc.

A variation of angles of attack 710 is also depicted in FIG. 9, in this instance the variation of angles of attack 710 of a blade of a wind turbine operating at wind shear (m)=0.4 and no yaw angle (see line 520).

In an embodiment, the yaw angle (yaw angle setting (210)) is configured to reduce a variation of an angle of attack 710 on a section of the blade in a range of azimuthal angles of the blade; particularly when the variation is compared to the variation at zero yaw angle. For example, the angle of attack and/or the variation of the angle of attack 710 could be reduced over the entire range of azimuthal angles of the blade (0° through 360°); alternatively or additionally the reduction could be over a smaller range of azimuthal angles, such as a range near 0° and/or a range including 0°.

Figure 10:
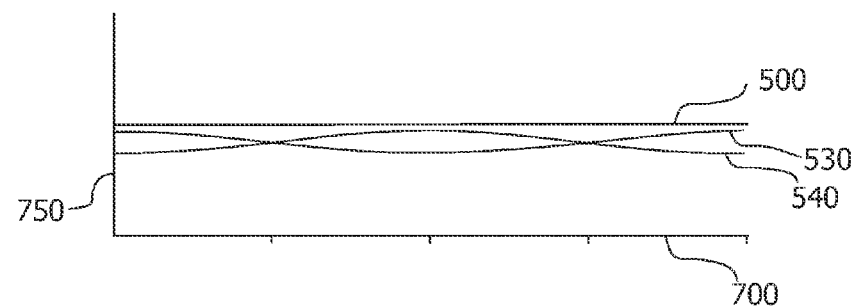
FIG. 10 illustrates the effect of wind shear on angle of attack, and is useful for understanding the embodiments described herein.

FIG. 10 illustrates the effect of yaw angle on angle of attack, according to the expression above. The horizontal axis 700 is the blade azimuthal angle ranging from 0° to 360°, and the vertical axis 750 is the angle of attack. In FIG. 10, the wind shear is 0. The angle of attack at 0° yaw angle is given by line 500; in other words the rotor axis is aligned with the wind direction in the yaw plane. The angle of attack at yaw angle ($\gamma$)=−20° is given by line 530. The angle of attack at yaw angle ($\gamma$)=+20° is given by line 540. FIG. 10 illustrates for example that a yaw angle may reduce the angle of attack.

Figure 11:
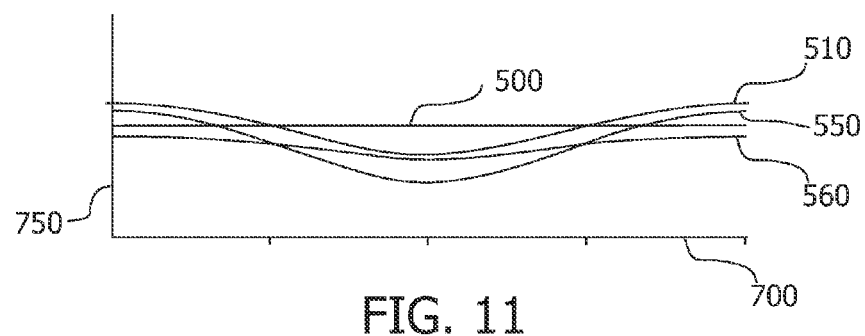
FIG. 11 illustrates the effect of yaw angle on angle of attack, according to an embodiment.

FIG. 11 illustrates the effect of both yaw angle and shear on angle of attack, according to the analytical expression above. The horizontal axis 700 is the blade azimuthal angle ranging from 0° to 360°, and the vertical axis 750 is the angle of attack. For ease of comparison, line 500 which corresponds to no shear and no yaw angle is shown. Also, line 510 which corresponds to wind shear (m)=0.2 and 0° yaw angle ($\gamma$) is shown. Line 550 corresponds to wind shear (m)=0.2 and −20° yaw angle ($\gamma$). Line 560 corresponds to wind shear (m)=0.2 and +20° yaw angle ($\gamma$). FIG. 11 illustrates that a yaw angle can reduce and/or counteract the effect of wind shear on the angle of attack.

Figure 12:
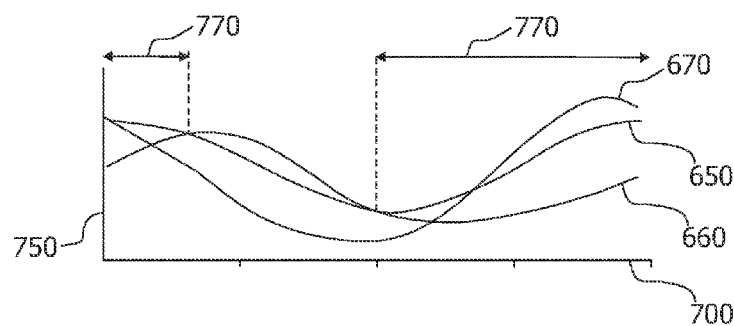
FIG. 12 illustrates the effect of both yaw angle and shear on angle of attack, according to an embodiment.

FIG. 12 illustrates the effect of wind shear on angle of attack, according to an aeroelastic simulation, according to an embodiment. An aeroelastic simulation can be performed using for example an actual blade geometry in for example conditions that lead to high average angles of attack, as depicted in the non-limiting example of FIG. 12. The angle of attack at wind shear (m)=0.3 and no yaw angle is given by line 650. The angle of attack at wind shear (m)=0.3 and yaw angle −20° is given by line 660. The angle of attack at wind shear (m)=0.3 and yaw angle +20 is given by line 670.

Although differences exist between the analytical results and the aeroelastic simulation results of FIG. 12, it is clear for example that in both cases a negative yaw reduces the angle of attack over azimuthal angles where the angle of attack is the highest. Therefore, a yaw angle setting can indeed be determined that can reduce the angle of attack, the angle of attack over a range of azimuthal angles, and/or a variation of the angle of attack, for example in the presence of wind shear. Furthermore, by affecting the angle of attack, noise can be reduced. It is contemplated that different expressions, models, simulations, algorithms, feedback algorithms, and the like can be used to determine the yaw angle for example based on the wind shear, angle of attack, noise, etc.

In an embodiment which may be combined with other embodiments, the yaw angle (yaw angle setting (210)) is configured to reduce the angle of attack on a section of the blade in a range 770 of azimuthal angles 860 (azimuthal blade orientations), in comparison to the angle of attack at a zero yaw angle; and optionally the section of the blade in the range 770 of azimuthal angles 860 sweeps an area of higher average wind speed in comparison to a second area located opposite to the range 770 of azimuthal angles 860 with reduced angle of attack. In a further embodiment, the range 770 of reduced angle of attack includes that at the azimuthal angle of 0°, which is the blade oriented upwardly, extending upwardly from the hub. For example. FIG. 12 illustrates that at azimuthal angle 0°, a yaw angle of −20° exhibits a lower angle of attack for a range 770 of azimuthal angles 860 that includes 0° (comparing line 660 and line 650; which show for a wind shear of 0.3, a yaw angle of −20°, line 660, has a lower angle of attack at the azimuthal angle of 0° than does the 0° yaw angle at the same value of wind shear, line 650, and azimuthal angle of 0°). The range 770 shown in FIG. 12 is from approximately 180° to about 63°, including 0° (360°).

Particularly for conditions that include wind shear, it may be desirable to reduce the angle of attack for azimuthal angles near 0°, where the wind speed may be highest. For example, azimuthal angles near 0° can include the range 270° through 90°, 300° through 60°, and/or 330° through 30°.

FIGS. 13 through 18 illustrate the impact of yaw angle and wind shear on blade stall, or angle of blade stall, according to a simulation. The area between the concentric circles 800, 810 represents an outer section of the area swept by the blades 22 as they rotate (i.e. the view is facing the wind turbine from the front, the hub 20 being in the center of the circles 800, 810). The regions 820 represent regions, e.g. ranges of azimuthal angles and radial distances, where the angles of attack may exceed the stall angle, "stall regions" herein, which may alternatively or additionally be regions where exceeding the stall angle is likely, for example as based on a model and/or simulation. For clarity, the hub and blades are not shown in FIGS. 14 through 18.

Figure 13:
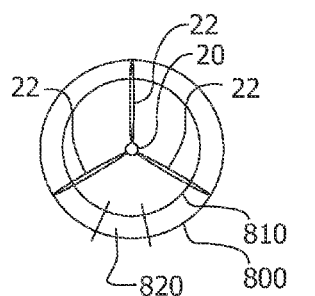
FIGS. 13 through 18 illustrate the impact of yaw angle and wind shear on blade stall, according to an embodiment.

FIG. 13, which illustrates that the region 820 exceeding the stall angle includes the azimuthal angle of 180°, near the bottom of rotation, for the case of no yaw angle and no wind shear. (In FIG. 13, the blades are depicted at azimuthal angles 0°, 120°, and 240°.) In other words, the stall region is near where the blade is in front of the tower.

Figure 14:
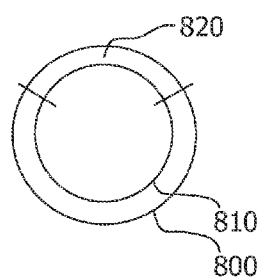
Figure 15:
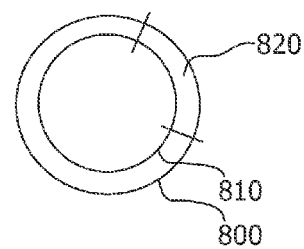
Figure 16:
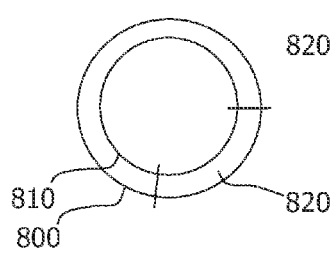
Figure 17:
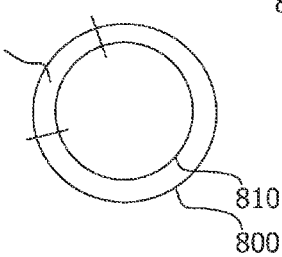
Figure 18:
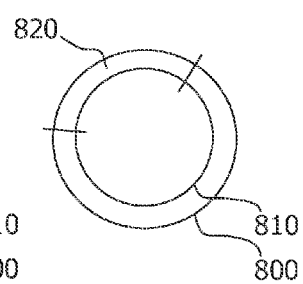

FIG. 14 illustrates the case of wind shear (m) of 0.3 and no yaw angle, with the angle of attack exceeding the stall angle for regions near the top of the rotation, i.e. including azimuthal angle 0°. FIG. 15 illustrates the case of wind shear (m) 0.3 and yaw angle −20°. FIG. 16 illustrates the case of no wind shear and a yaw of −20°. FIG. 17 illustrates the case of no wind shear and a yaw angle of +20°. Finally, FIG. 18 illustrates the case of wind shear (m) 0.3 and yaw angle of +20°. It is noted that for example, in the case of a wind shear (m) of 0.3, finer modeling results than are depicted in FIGS. 13 through 18 indicate that the region that exceeds the stall angle is approximately 37.5% smaller when the wind turbine is operated at a yaw angle of −20° in comparison to a zero yaw angle. The region that exceeds the stall angle can be even smaller or nonexistent in other conditions, for example in conditions of lower wind shear and/or conditions of better optimized operational parameters including for example yaw angle and pitch.

In an embodiment, the yaw angle (yaw angle setting (210)) is such that the range of azimuthal angles for which the angle of attack exceeds the stall angle is reduced in comparison to that of a zero yaw angle. Alternatively or additionally, the center of the stall region is shifted azimuthally away from 0° in comparison to a zero yaw angle. Furthermore, the yaw angle setting, particularly in combination with a pitch setting (which may be an increased pitch setting) determined from the wind shear and/or noise, may eliminate the stall region.

Figure 19:
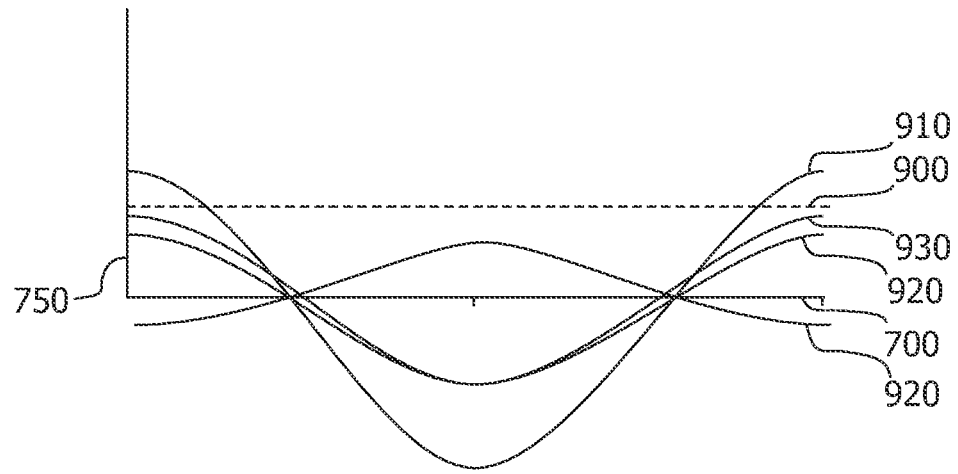
FIG. 19 illustrates the effect of yaw angle on angle of attack, according to an embodiment.

FIG. 19 illustrates the effect of yaw angle on angle of attack, according to aeroelastic simulation results. The horizontal axis 700 is the blade azimuthal angle ranging from 0° to 360°, and the vertical axis 750 is the angle of attack. A separation limit 900 is also shown. The separation limit 900 may coincide with a desired upper limit of the angle of attack, for example because of undesirable effects including noise, increased risk of noise, turbulence, loss of energy capturing efficiency, etc. In an embodiment, the yaw angle is such that the separation limit 900 is not exceeded, at least for a range of azimuthal angles, particularly ones near 0°, more particularly in conditions of wind shear.

In an embodiment, the wind turbine is operated such that the angle of attack remains below the separation limit, and/or such that there is a reduced risk of the angle of attack being above the separation limit, such as is illustrated in FIG. 19.

For example: the line 910 corresponds to the angle of attack in the presence of wind shear at 0° yaw angle and there are azimuthal angles which exceed the separation limit 900; the line 920 corresponds to the angle of attack when the yaw angle is positive and there is no wind shear, line 930 corresponds to the angle of attack when the yaw angle is negative and there is no wind shear; line 930 corresponds to the reduction of the angle of attack in comparison to line 910, which can be the result of a yaw offset, i.e. of adding lines 910 and 930. For example, by introducing a negative yaw offset to the conditions that bring about the angles of attack given by line 910, the angles of attack (resulting in line 930) are kept below the separation limit 900.

Figure 20:
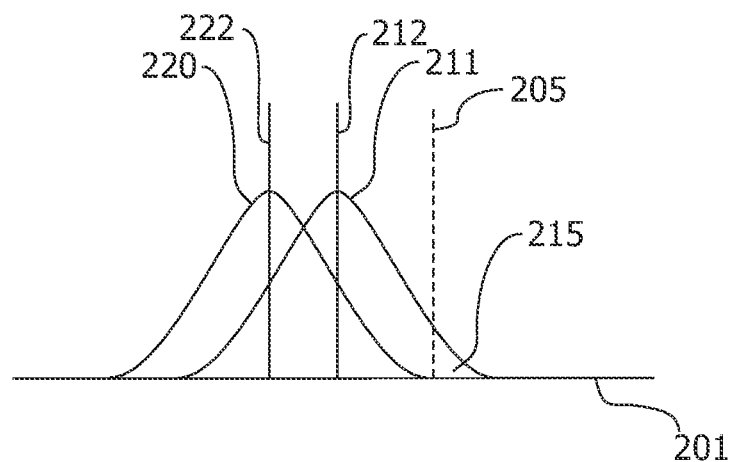
FIG. 20 illustrates probability distributions of an operational value, according to an embodiment.

FIG. 20 illustrates probability distributions of an operational value 201. A critical value 205 of the operational value 201 is shown, above which operation is critical. For example the operational value 201 can be the yaw angle and the critical value 205 be a value of yaw angle which results in abnormal amplitude modulation, separation, and/or turbulence. For example, a first probability distribution 211 of the operational value has a significant portion 215 above the critical value 205; a second probability distribution 220 of the operational value 201 does not have a significant portion above the critical value 205. In an embodiment, the operational value is the yaw angle. In another embodiment, the operational value is the angle of attack. The probability distributions 211, 220 of the operational values have average operational values (212, 222, respectively), which may correspond to set point values, i.e. operational set points such as a set yaw angle, or yaw angle setting (210). For example (without being limiting), a yaw angle setting (210) of −20° may in actuality have operational values of most likely between −22° and 18° and an average of −20°.

Figure 21:
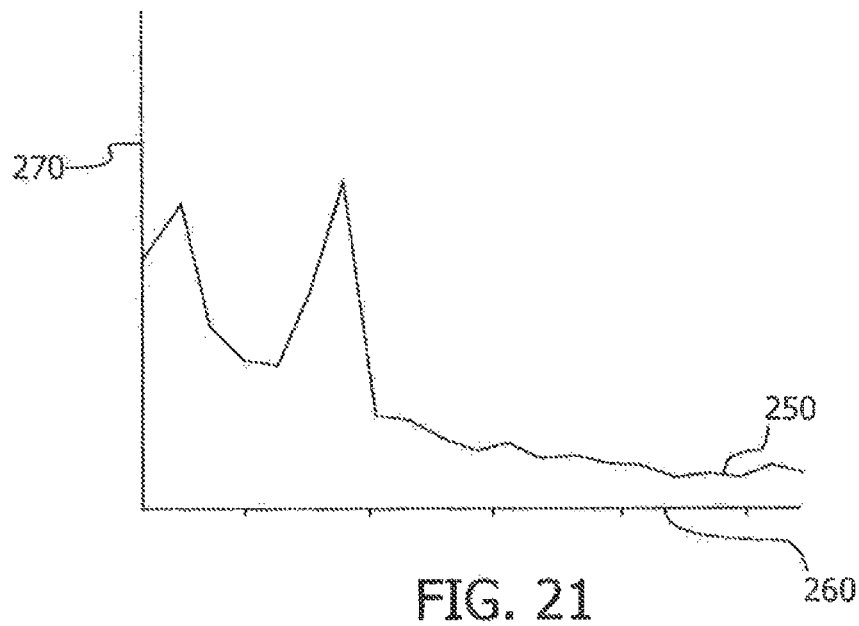
FIG. 21 illustrates a FFT of a sound power level of a wind turbine, and is useful for understanding the embodiments described herein.

FIG. 21 illustrates a FFT 250 of a sound power level of a wind turbine. The horizontal axis 260 is the frequency and the vertical axis 270 is the FFT amplitude. Sampling times for the data may vary, for example approximately 50 ms intervals, or intervals such as approximately 100 ms, 200 ms, 300 ms. For example, a FFT can be taken every 10 seconds or so, (20 s, 30 s, . . . ) or every minute or so (1 min, 2 min, 3 min, . . . ), and this may vary. A noise such as an abnormal amplitude modulation noise can be determined from the FFT. In an embodiment, the maximum near the blade passing frequency can be used as a feedback parameter in determining the yaw angle setting 210. More generally, in an embodiment which may be combined with other embodiments described herein, the yaw angle setting 210 can be determined based on noise, e.g. the abnormal amplitude modulation determined from the FFT, and/or a measured and/or integrated noise amplitude such as at a particular frequency range optionally modulated at a second frequency such as a blade passing frequency; for example such a noise could be used as a feedback parameter in determining an optimal (e.g. quiet yet efficient) yaw angle setting 210, optionally in combination with a pitch setting and/or the like.

In an embodiment that may be combined with any other embodiment, the noise (such as a level of noise and/or an amplitude of a noise such as within a frequency band which may be modulated by a second frequency having a second frequency's bandwidth), particularly (abnormal) amplitude modulation can be determined. The noise, level, and/or amplitude of noise can be used as a feedback parameter in determining the yaw angle setting and optionally other operational setting for example blade pitch setting (the blade pitch setting of each individual blade or of any number of the blades). For example, an input can be recorded and/or processed such as filtered, and/or Fourier transformed for example to determine a noise. Alternatively or additionally, the noise can be correlated and/or compared with for example a noise and/or a noise level such as one associated with a noise held in memory (i.e. noise measurements, mathematically modeled noise levels, noise levels stored in memory at for example varying conditions including operating parameters, time, wind speeds, blade pitches, yaw angles, and/or wind shears). The determined noise, comparison, and/or correlation can then be used to determine the yaw angle setting, and the wind turbine operated at the yaw angle setting. For example, the memory can provide a data array of conditions including for example measured, simulated, and/or extrapolated values for interdependent parameters such as: wind direction, speed, shear, pitch, yaw angle, angle of attack, azimuthal angle, and noise. The data array can be used to compare and/or correlate current conditions to conditions held in the data array, and the yaw angle setting (as well as optionally the pitch setting for example) determined based on the comparison and/or correlation.

In an embodiment that can be combined with any other embodiment, the noise is determined and the yaw angle setting is determined based on the noise, particularly the abnormal amplitude modulation.

In a nonlimiting example, the (abnormal) amplitude modulation can be determined by measuring noise, e.g. with a microphone or the like, versus time with a sample rate for example of 2 times per second or up to about 200 times per second: the sampling can occur over a duration of for example 10 seconds to 1 minute; the resulting time trace is Fourier transformed, for example FFT'ed; for example the height of a peak may be associated with the (abnormal) amplitude modulation.

Figure 22:
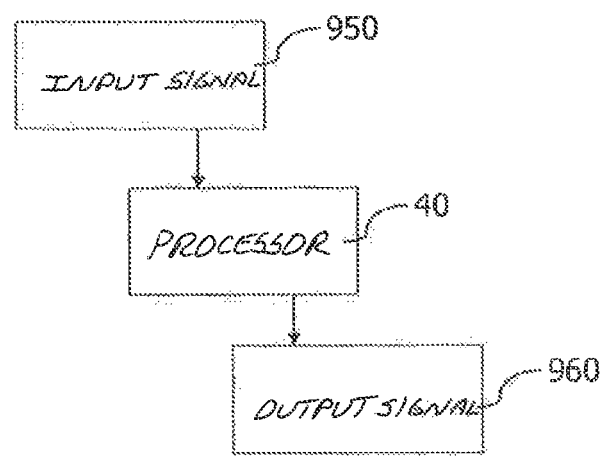
FIG. 22 depicts schematically a method for operating a wind turbine, according to an embodiment.

FIG. 22 depicts a control system, or simply "system" which includes a processor 40, a signal input 950, and a signal output 960. In an embodiment, the output signal corresponds to the signal to the yaw drive mechanism 56 which results in yawing of the wind turbine to the yaw angle setting, particularly for controlling noise generated by the wind turbine. The signal output 960 can also be a plurality of signal outputs such as further including a pitch setting in addition to the yaw setting. The input signal 950 can be wind direction for example. Determination of the yaw angle setting 1010 can be based on a signal that is acquired 1040, such as wind direction, wind shear 280, wind speed, wind velocity, a temperature, a time such as daytime or nighttime, a variation 710 of an angle of attack, a main shaft bending moment, a noise, and any combination thereof.

For example, a plurality of input signals are received, e.g. a plurality of wind velocities or wind speeds are received by the processor, and used to determine (such as calculate, recall from memory, or determine by an error minimization algorithm such as least squares) wind shear. In an embodiment which may be combined with any embodiment described herein, the yaw angle setting is determined based on the wind shear 280.

In yet another embodiment, the variation of the angle of attack of a blade or simply the angle of attack as dependent on azimuthal angle, for example based on the wind shear determination, is determined. For example, through estimation, calculation, and/or from data (such as model data) held in memory, the yaw angle can be determined. A model may take into account one or more variables such as blade pitch, wind shear, wind speed, wind velocity (or plurality of wind velocities such as at different locations), a temperature, a time (such as night/day). Alternatively or additionally, the yaw angle setting can be determined based on a main shaft bending moment which can be measured with a sensor or plurality thereof.

In yet another embodiment, the yaw angle setting is determined based on the wind shear, and the wind shear is determined based on at least one of: an estimation, a receiving of a meteorological datum (or data), and a measurement. For example, wind shear can be estimated based on time of day and temperature, for example using a look-up table of data that correlates time and temperature to wind shear. In yet another example, meteorological data can be received, for example from a weather information service and/or from neighboring anemometers and/or meteorological masts 58 possibly of neighboring wind turbines. Meteorological data such wind speed, direction, velocity is envisioned.

Alternatively or additionally, wind shear can be based on a measurement, e.g. that of the anemometer and/or meteorological masts of the wind turbine. Alternatively or additionally the wind shear can be determined from a LIDAR measurement. Yet another possibility is that a sensor or plurality of sensor (e.g. a microphone or plurality of microphones) measures for example a noise, and this is used to determine the wind shear and/or the yaw angle setting directly. It is also contemplated that the estimated power capture or annual energy production can also be used to determine the yaw angle (e.g. in combination with other factors).

Figure 23:
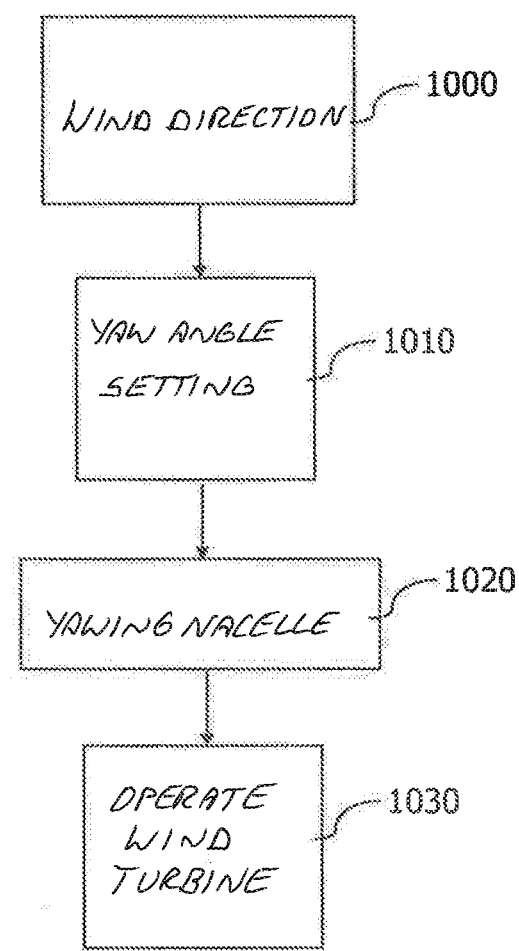
FIG. 23 depicts schematically a method for operating a wind turbine, according to an embodiment.

FIGS. 23 and 24 depict schematically methods for operating a wind turbine. A wind turbine may include a rotor including a rotor blade, the rotor rotatably coupled to a nacelle, and the rotor rotatable about a horizontal rotor axis extending through the nacelle. The nacelle is rotatably coupled to a tower, the nacelle rotatable in a yaw plane about a yaw axis. The method includes determining a wind direction 1000; determining a yaw angle setting 1010, wherein the yaw angle setting 210 deviates from an alignment of the rotor axis and the wind direction in the yaw plane; yawing the nacelle to the yaw angle setting 1020; and operating the wind turbine 1030 for example for generating electricity. In an embodiment which may be combined with any other embodiment described herein, the yaw angle is determined based on the wind direction. For example, the yaw angle setting can be configured to reduce the angle of attack, particularly in a condition of wind shear.

In an embodiment, the determination of the yaw angle setting 1010 is based on at least one of: a wind shear 280, wind speed, wind velocity, a temperature, a time such as daytime or nighttime, a variation 710 of an angle of attack, a main shaft bending moment, and a noise. Alternatively or additionally, as depicted in FIG. 24, the determination of the yaw angle setting 1010 is based on a signal that is acquired 1040, such as a wind shear 280, wind speed, wind velocity, a temperature, a time such as daytime or nighttime, a variation 710 of an angle of attack, a main shaft bending moment, and a noise. A time can alternatively or additionally be determined internally by the processor.

In an embodiment, an acquired signal is used as feedback to determine the yaw angle setting, as depicted for example in FIG. 24. Optionally, the wind direction can also be used as a feedback parameter, as depicted in FIG. 25. Omitting yawing the nacelle 1020 is contemplated for some iterations of the feedback loop, for example if the yaw angle setting is determined to be the same as the actual yaw angle (particularly a nonzero yaw angle).

It is noted that embodiments described herein include those in which wind shear and/or the variation of the angle of attack which may be influenced by wind shear is determined, and a yaw angle setting is determined. Wind shear can be determined by at least one of: an estimation, a receiving of a meteorological datum, and a measurement. The measurement can be by at least one of: a meteorological mast 58, a LIDAR measurement, a sensor, and a plurality of sensors such as an acoustic camera.

For example, the wind shear may be determined by measuring wind speed at a single or multiple locations, and/or by estimation. For example based on a single wind speed measurement at a location, wind shear can be estimated. Alternatively or additionally, wind shear can be estimated based on multiple wind speed measurements at different locations, temperature, wind direction, and/or time such as daytime/nighttime. A meteorological measurement mast and/or a remote sensing device such as LIDAR may be used to determine wind speed and/or wind shear.

In an embodiment that may be combined with any other embodiment described herein, the absolute value of the yaw angle setting is more than about 2°, 3°, 4°, 5°, and/or 6°; alternatively or additionally, the absolute value of the yaw angle setting is from about 2 degrees to about 24 degrees, or from about 2 to about 16, or from about 4 to about 14, or from about 5 to about 12 degrees.

In an embodiment that may be combined with any other embodiment described herein, the (determination of) yaw angle setting can be combined with (the determination of) another operational setting to adjust, set, and/or influence the operation of the wind turbine, particularly for generating electrical energy. For example, yaw and pitch can be adjusted in combination (simultaneously or in series) for example to control noise, angle of attack, power capture (such as estimated annual energy production etc.), fatigue load, and the like.

In an embodiment that may be combined with any other embodiment described herein, the wind shear is determined to be nonzero, and the yaw angle setting is determined based on the nonzero wind shear.

In an embodiment that may be combined with any other embodiment described herein, the pitch setting is determined, such as determined based on the wind shear and/or noise. Alternatively or additionally a wind speed, a wind velocity, a temperature, a time, a variation of an angle of attack, a main shaft bending moment, a noise, and any combinations thereof are used to determine the pitch setting. Particularly, it is possible to determine a pitch setting and yaw angle setting, such as to operate the wind turbine at the yaw angle setting and the pitch setting (e.g. by pitching the blade to the pitch setting and yawing the nacelle to the yaw angle setting). Furthermore, for example, the pitch setting can be an increased pitch setting, the blade(s) pitched to the increased pitch setting, and the nacelle yawed to the yaw angle setting. It is contemplated that if the pitch setting and/or yaw angle setting are close to or the same as the actual pitch and/or yaw angle, one and/or the other of the pitch or yaw (i.e. the respective movements) may be omitted.

A technical effect of the above-described systems and methods facilitate noise reduction such as reduction of abnormal amplitude modulation.

Exemplary embodiments of systems and methods for operating a horizontal axis wind turbine, controlling noise generated by a horizontal axis wind turbine, and a horizontal axis wind turbine are described above in detail. The systems and methods are not limited to the specific embodiments described herein, but rather, components of the systems and/or steps of the methods may be utilized independently and separately from other components and/or steps described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

Particularly for purposes of establishing priority in foreign jurisdictions, it is noted that embodiments disclosed herein include embodiments defined by each dependent claim, which refers directly or indirectly to an independent claim, as if each dependent claim were dependent on any preceding claim that refers directly or indirectly to the same independent claim.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a horizontal axis wind turbine, the wind turbine including a rotor with the rotor including a rotor blade, wherein the rotor is rotatably coupled to a nacelle, and the rotor is rotatable about a horizontal rotor axis extending through the nacelle, and wherein the nacelle is rotatably coupled to a tower, the nacelle being rotatable in a yaw plane about a yaw axis, the method comprising:
    determining a wind direction;
    determining a yaw angle setting, wherein the yaw angle setting deviates from an alignment of the rotor axis and the wind direction in the yaw plane;
    determining wind shear, wherein the yaw angle setting is determined as a function of the determined wind shear;
    yawing the nacelle to the yaw angle setting; and,
    operating the wind turbine.

2. The method for operating a horizontal axis wind turbine of claim 1, wherein the wind shear is determined based on at least one of:
    an estimation, a receiving of a meteorological datum, and a measurement; wherein the measurement is by at least one of:
    a meteorological mast, a LIDAR measurement, a microphone, a plurality of microphones, a sensor, and a plurality of sensors.

3. The method for operating a horizontal axis wind turbine of claim 1, wherein
    the yaw angle setting is configured to reduce an angle of attack on a section of the blade in a range of azimuthal angles of the blade, the yaw angle setting applied when the blade enters the range of azimuthal angles and discontinued when the blade leaves the range of azimuthal angles, wherein,
    the angle of attack at the yaw angle setting is lower in comparison to the angle of attack at a zero yaw angle; and, wherein,
    the zero yaw angle corresponds to the alignment of the rotor axis and the wind direction in the yaw plane.

4. The method for operating a horizontal axis wind turbine of claim 3, wherein
    the range of azimuthal angles and the section of the blade sweep an area of higher average wind speed in comparison to a second area located opposite to the range of azimuthal angles.

5. The method for operating a horizontal axis wind turbine of claim 4, wherein
    the range of azimuthal angles includes 0 degrees which is directed upwardly.

6. The method for operating a horizontal axis wind turbine of claim 1, wherein
    an absolute value of the yaw angle setting is more than about 2 degrees.

7. The method for operating a horizontal axis wind turbine of claim 6, wherein an absolute value of the yaw angle setting is from about 2 degrees to about 16 degrees.

8. The method for operating a horizontal axis wind turbine of claim 1, wherein
the yaw angle setting is configured and applied to reduce a variation of an angle of attack on a section of the blade in a limited range of azimuthal angles of the blade that is less than a full range of azimuthal angles of the blade; wherein the variation is compared to the variation at zero yaw angle; and, wherein, the zero yaw angle corresponds to the alignment of the rotor axis and the wind direction in the yaw plane.

* * * * *